United States Patent [19]
Glover et al.

[11] Patent Number: 5,212,728
[45] Date of Patent: May 18, 1993

[54] DYNAMIC TRACE ELEMENTS

[75] Inventors: Thomas E. Glover, Ajax; Derek K. W. Smith, Toronto, both of Canada

[73] Assignee: International Business Machines Corporation, Armonk, N.Y.

[21] Appl. No.: 766,607

[22] Filed: Sep. 26, 1991

[30] Foreign Application Priority Data

Oct. 5, 1990 [CA] Canada ................................ 2026998

[51] Int. Cl.⁵ .............................................. H04L 9/00
[52] U.S. Cl. ...................................................... 380/4
[58] Field of Search ....................... 380/3, 4; 365/228; 364/184

[56] References Cited

U.S. PATENT DOCUMENTS

| | | | |
|---|---|---|---|
| 4,598,170 | 7/1986 | Piosenka et al. | 380/4 |
| 4,813,024 | 3/1989 | Lisimaque et al. | 380/4 |
| 5,027,398 | 6/1991 | Miyoshi | 380/4 |

Primary Examiner—Salvatore Cangialosi
Attorney, Agent, or Firm—Jack M. Arnold

[57] ABSTRACT

The present invention relates to a dynamic hardware tracer for use in a circuit. The circuit is comprised of real circuitry which performs a real function and the tracer. The tracer is comprised of functional tracer circuitry which receives input signals from the real circuitry and processes the input signals. The functional tracer circuitry does not interact with the real circuitry to contribute to or modify the real function of the circuit. The dynamic hardware tracer provides an indication of a copied circuit. The present invention also relates to a dynamic software tracer located within a piece of software. The dynamic tracer is comprised of at least one line of software tracer code imbedded in a block of real software code. The at least one line of software tracer code interacts with a tracer output signal from tracer circuitry located in a circuit which also includes real circuitry which produces real output signals providing a real function. The block of real software code interacts with the real output signals. The software tracer does not effect the operation of the real software, the real circuitry or the real function. The software tracer provides an indication of copied software. The piece of software need not interact with an integrated circuit, in which case the dynamic tracer is comprised of a block of software tracer code which is imbedded in and interacts with the block of real code but which does not effect the running of the real code. Methods are also provided for determining the origin of both hardware components and software.

10 Claims, 6 Drawing Sheets

```
         618           OUT    CMD-PORT,AL
         619           CALL   KBD-RESET        ; SEE IF MFG. JUMPER IN
         620           CMP    BL,0AAH          ; KEYBOARD PRESENT?
         621           JE     E6
         622           CMP    BL,065H          ; LOAD MFG. TEST REQUEST?
         623           JNE    D3B
         624           JMP    MFG-BOOT         ; GO TO BOOTSTRAP IF SO
         625   D3B:    MOV    AL,38H
70 ─     626           OUT    PORT-B,AL
         627           NOP
         628           NOP
         629           IN     AL,PORT-A
         630           AND    AL,0FFH          ; WAS DATA LINE GROUNDED
         631           JNZ    E6
         632                  DATA-AREA(OFFSET MFG-TST); SET MFG TEST FLAG

633           MOV    AX,3B0H          ; CHECK SCREEN COL PORT
         634           MOV    DX,AX
         635           MOV    AL,01010101B     ; VALVE TO TEST EACH OTHER BIT
         636           OUT    DX,AL            ; SEND THE VALVE
         637           IN     AH,DX            ; GET THE VALVE
         638           CMP    AH,AL            ; CHECK FOR PORT OPERATION
         639                  VD01
         640           HLT
         641   VD01:   MOV    AL,10101010B     ; VALVE TO TEST EACH OTHER BIT
         642           OUT    DX,AL            ; SEND THE VALVE
         643           IN     AH,DX            ; GET THE VALVE
         644           CMP    AH,AL            ; CHECK FOR PORT OPERATION
         645           JE     VD02
         646           HLT
         647   VD02:   MOV    AX,3B1H          ; CHECK SCREEN ROW PORT
         648           MOV    DX,AX
         649           MOV    AL,01010101B     ; VALVE TO TEST EACH OTHER BIT
         650           OUT    DX,AL            ; SEND THE VALVE
         651           IN     AH,DX            ; GET THE VALVE
72 ─     652           CMP    AH,AL            ; CHECK FOR PORT OPERATION
         653           JE     VD03
         654           HLT
         655   VD03:   MOV    AL,10101010113   ; VALVE TO TEST EACH OTHER BIT
         656           OUT    DX,AL            ; SEND THE VALVE
         657           IN     AH,DX            ; GET THE VALVE
         658           CMP    AH,AL            ; CHECK FOR PORT OPERATION
         659           JE     VD04
         660           HLT
         661   VD04:   MOV    AX,3BFH          ; CHECK SCREEN ACTIVE PORT
         662           MOV    DX,AX
         663           MOV    AL,0101010113    ; VALVE TO TEST EACH OTHER BIT
         664           OUT    DX,AL            ; SEND THE VALVE
         665           IN     AH,DX            ; GET THE VALVE
         666           CMP    AH,AL            ; CHECK FOR PORT OPERATION
         667           JE     VD05
         668           HLT
         669   VD05:   MOV    AL,10101010B     ; VALVE TO TEST EACH OTHER BIT
         670           OUT    DX,AL            ; SEND THE VALVE
         671           IN     AH,DX            ; GET THE VALVE
         672           CMP    AH,AL            ; CHECK FOR PORT OPERATION
         673           JE     VD06
         674           HLT

675   E6:
         676           MOV    AX,DATA-WORD(OFFSET EQUIP-FLAG); GET SENSE SWITCH INFO
         677           PUSH   AX               ; SAVE IT
         678           MOV    AL,30H
70 ─     679           MOV    DATA-WORD(OFFSET EQUIP-FLAG),AX
         680           SUB    AH,AH
         681           INT    10H              ; SEND INIT TO B/W CARD
         682           MOV    AL,20H
```

FIG. 5

```
5838    PRINT_SCREEN  PROC    FAR
5839    STI                     ; MUST RUN WITH INTERRUPTS ENABLE
5840    PUSH   DS             ; MUST USE 50:0 FOR DATA AREA STORAG
5841    PUSH   AX
5842    PUSH   BX
5843    PUSH   CX             ; WILL USE THIS LATER FOR CURSOR LIM
5844    PUSH   DX             ; WILL HOLD CURRENT CURSOR POSITION

5845    CALL   DDS
5846    MOV    AL,KB_FLAG_1   ; GET KEYBOARD STATE
5847    AND    AL,00000111B   ; ISOLATE 3 BITS
5848    CMP    AL,2           ; CHECK DEBOUNCE CONTROL
5849    JNE    SET_HEX
5850    CALL   KBD_RESET
5851    SET_HEX

5852    MOV    AX,XXDATA      ; HEX 50
5853    MOV    DX,AX
5854    CMP    STATUS_BYTE,1  ; SEE IF PRINT ALREADY IN PROGRESS
5855    JZ     EXIT           ; JUMP IF PRINT ALREADY IN PROGRESS
```

FIG. 6

```
; Check for Hardware Tracer
; Screen Col Port.
        XOR     BX,BX                   ; USE REGISTER BX FOR SUCCESS
        MOV     AX,3B0H                 ; SET ADDR'S TO SCREEN COL PORT
        MOV     DX,AX                   ; PLACE ADDR'S INTO REGISTER DX
        MOV     AL,0FFh                 ; SET ALL PORT BITS ON
        OUT     DX,AL                   ;
        XOR     AH,AH                   ; SET REGISTER TO ZERO
        IN      AH,DX                   ; GET THE PORT VALUE
        CMP     AH,AL                   ; CK FOR HARDW'R TRACER
        JNE     NO_SUCCESS_COL_PORT     ; ERROR EXIT
        OR      BX,00000001B            ; SET SCREEN COL PORT FOUND
; Check for Hardware Tracer
; Screen Row Port.

NO_SUCCESS_COL_PORT                     ; TRY NEXT HARDWARE TRACER
        MOV     AX,3B1H                 ; SET ADDR'S TO SCREEN ROW PORT
        MOV     DX,AX                   ; PLACE ADDR'S INTO REGISTER DX
        MOV     AL,0FFh                 ; SET ALL PORT BITS ON
        OUT     DX,AL                   ;
        XOR     AH,AH                   ; SET REGISTER TO ZERO
        IN      AH,DX                   ; GET THE PORT VALUE
        CMP     AH,AL                   ; CK FOR HARDW'R TRACER
        JNE     NO_SUCCESS_COL_PORT     ; ERROR EXIT
        OR      BX,00000010B            ; SET SCREEN ROW PORT FOUND
; Check for Hardware Tracer
; Screen Active Port.

NO_SUCCESS_ROW_PORT                     ; TRY NEXT HARDWARE TRACER
        MOV     AX,3BFH                 ; SET ADDR'S TO SCR'N ACTIVE PORT
        MOV     DX,AX                   ; PLACE ADDR'S INTO REGISTER DX
        MOV     AL,0FFh                 ; SET ALL PORT BITS ON
        OUT     DX,AL                   ;
        XOR     AH,AH                   ; SET REGISTER TO ZERO
        IN      AH,DX                   ; GET THE PORT VALUE
        CMP     AH,AL                   ; CK FOR HARDW'R TRACER
        JNE     NO_SUCCESS_ACT_PORT     ; ERROR EXIT
        OR      BX,00000010B            ; SET SCREEN ACTIVE PORT FOUND
; Check for Hardware Tracer
; Screen Active Port.

NO_SUCCESS_ACT_PORT                     ; FINISHED ALL HARDARE TRACERS
        CMP     BX,0                    ; CK FOR FOUND HARDWARE TRACERS
        JE      NO_TRACER_EXIT          ;
        CALL    BEEP                    ; SOUND BEEP FOR 1 FOUND TRACER
        DEC     BX                      ;
        CMP     BX,0                    ; CK FOR 2ND FOUND TRACER
        JE      NO_TRACER_EXIT          ;
        CALL    BEEP                    ; SOUND BEEP FOR FOUND TRACER
        DEC     BX                      ;
        CMP     BX,0                    ; CK FOR 3RD FOUND TRACER
        JE      NO_TRACER_EXIT          ;
        CALL    BEEP                    ; SOUND BEEP FOR FOUND TRACER
NO_TRACER_EXIT
```

FIG 7

DYNAMIC TRACE ELEMENTS

The present invention relates to a method and apparatus for detecting the presence of one's copyright material in another's hardware and/or software products or, in other words, tracing the origin of the material in question. More particularly the present invention relates to a dynamic tracing technique which can be implemented in both a hardware form, a software form, or a combined hardware/software form.

BACKGROUND OF THE INVENTION

Prior art techniques have been developed for inserting static tracers into software code so that it is possible to determine if a piece of software has been copied or pirated. Prior art tracers are of a static nature in that they are merely lines of code that do nothing and are ignored by the program as it runs. However, these lines of do nothing code are in the program code and if the code has been copied they will appear in the copied version of the code and will be evidence of copying This is true, because anyone who writes original code would not include the tracer in the program code. If a person writing original code decided to insert a tracer into a program, the chances of the tracer being the same code and of it being located in the same position within the real code would be extremely remote.

Those who copy software are becoming more sophisticated, and are de-compiling the software which they wish to copy so that they can read it and make subtle changes to it. The fact remains that the work is copied in the main and constitutes an infringement of copyright in many jurisdictions. However, since the sophisticated copier can read the code he is about to copy he can find the static tracer code, since it does nothing, and remove it from the program prior to copying. This is the drawback of inserting a static tracer into program code.

In a similar manner, sophisticated hardware copiers are reverse engineering micro chips or integrated circuits and using their knowledge of the reverse engineered chip are making clones of that chip without having to go through the expensive design and development stage.

DISCLOSURE OF THE INVENTION

The present invention is a technique for producing a type of dynamic tracer operable in both hardware, software, or in a combination thereof.

A hardware tracer manifests itself as dynamic circuitry on a portion of an integrated circuit or in discrete circuitry. This circuitry will be called in this application "tracer circuitry". It is circuitry which is connected to the rest of the circuitry of a product and which in fact may perform some function, but that function has nothing to do with the actual operation of the product. The remaining circuitry will be defined in this application as "real circuitry".

This hardware tracer is defined as being dynamic in that is does function. Not only does the tracer circuitry actually function but, it is connected to the real circuitry and can take logic signals from the real circuitry and process these signals to produce tracer output signals which can be detected. The tracer output signals are not necessary for the operation of the product. For example, if the product circuit is a video monitor driver and contains tracer circuitry, the tracer circuitry and any signals which the tracer circuitry produces are not used in the function of driving the video monitor.

Since those, who reverse engineering a product in order to copy it, do not go into the complicated and expensive process of determining how the product's circuit operates, they can not distinguish the tracer circuitry from the real circuitry and therefore will copy the tracer circuitry when they copy the product's real circuit. If the circuitry were static or passive it might become clearly obvious during the reverse engineering operation and could then be blanked out in the copy.

The tracer circuitry can produce output signals which can be detected by software. As a result, a detecting program can be written which probes for these signals and displays some kind of indication of their presence. If it is suspected that a piece of equipment contains a copied circuit, the detection program can be run and if an indication of the presence of the tracer signals ie present a good indication has been provided that the product's circuit has been copied. This technique eliminates the need to reverse engineer the suspected product circuit to determine if it is a copy.

The invention contemplates building into software a dynamic tracer which can be detected and which will provide evidence of copying.

Two embodiments of dynamic software tracers are provided by the present invention.

The first embodiment is one where one or more lines of tracer code are imbedded in lines of real code. The tracer software code interacts with the tracer circuitry described above. Once again, the tracer software code does nothing with respect to the running of the real software code, but since it reacts with actual hardware, ie the tracer circuitry, a copier who has dis-assembled the program will have considerable difficulty in determining this fact, especially if several tracer "units" are dispersed throughout the system. As a result, the copier is not likely to detect and take the tracer code out of the program prior to copying and the tracer will remain and thus provide evidence of copying.

One example of such a program is a diagnostic program used to check an integrated circuit such as a video driver integrated circuit. This program will be located in a ROM either on the mother board or the video card itself. The program tests the integrated circuit by providing input signals to the integrated circuit and by obtaining responses from the integrated circuit. The real software code will test the real circuitry and the tracer code, acting only as a dynamic tracer, will request responses from the tracer circuitry. Anyone trying to determine the operation of this program with the object in mind of copying the program would have significant difficulty in determining the tracer code. The copier would therefore be forced to leave the tracer code in the copied program, thus preserving the tracer.

The second embodiment is one in which one or more lines of tracer code interact with some lines of real code to produce results which are not related to the operation or running of the real code. Since the tracer code uses results derived from the real code and can even call up sub-routines of real code, it is very difficult to detect as being tracer code. As a result, a person even having disassembled the program will not readily be able to determine if the tracer code is necessary and will leave that code in the program, thus preserving the tracer.

One object of the present invention is to provide a dynamic hardware tracer which is comprised of tracer circuitry which interacts with real circuitry to produce tracer outputs which are present but which are not used in the operation of the real circuitry.

Another object of the present invention is to provide dynamic hardware detection software which can detect tracer signals generated by the tracer circuitry to detect the presence of tracer circuitry.

Another object of the present invention is to provide a dynamic software tracer which is comprised of software tracer code imbedded in real software code which interacts with the tracer signals generated by the tracer circuitry but which does not perform any useful function with respect to the running of the real software.

It is yet another object of the present invention to provide a dynamic software tracer which is comprised of software tracer code imbedded in real software code which interacts with that real software code but which performs a function which does not affect the running of the real software.

In accordance with one aspect of the present invention there is provided a dynamic hardware tracer for use in an integrated circuit which is comprised of real circuitry which performs a real function, the tracer being comprised of functional tracer circuitry which receives at least one input signal from said real circuitry and processes said at least one input signal, wherein said functional tracer circuitry does not interact with the real circuitry to contribute to or modify the real function of the integrated circuit, said dynamic hardware tracer, by its presence in other integrated circuits, providing an indication that such other integrated circuits have been copied from said integrated circuit.

In accordance with another aspect of the present invention there is provided an integrated circuit comprising:

(a) real circuitry which operates to generate at least one output signal which is output on at least one output terminal and which is used to provide a real function; and (b) tracer circuitry, connected to said real circuitry for electrically processing at least one real signal generated by said real circuitry, said tracer circuitry acting as a dynamic hardware tracer which interacts with said real circuitry, said dynamic hardware tracer thereby providing an indication by its presence in other integrated circuits that such other integrated circuits had been copied.

In accordance with yet another aspect of the present invention there is provided a dynamic software tracer located within a piece of software, the dynamic tracer comprising at least one line of software tracer code imbedded in a block of real software code, said at least one line of software tracer code interacting with a tracer output signal output from tracer circuitry located in an integrated circuit which also includes real circuitry which produces at least one real output signal providing a real function, said block of real software code interacting with said at least one real output signal, wherein said software tracer code does not affect the operation of the real software, the real circuitry or the real function, said software tracer thereby providing an indication by its presence in other software that such other software had been copied.

In accordance with still another aspect of the present invention there is provided a piece of software including a dynamic software tracer, wherein said piece of software is comprised of a block of real software code which carries out processing to provide a real function; and at least one line of software tracer code imbedded in said block of real software code, said at least one line of software tracer code interacting with said block of real software code to thereby receive instructions, said at least one line of software tracer code carrying out processing based on said instructions to produce a traceable result, said traceable result in no way affecting the operation of the block of real software or the real function, said at least one line of software tracer code thereby providing an indication by its presence in other software that such other software had been copied.

In accordance with still another aspect of the present invention there is provided a piece of software for detecting the presence of a dynamic product tracer located within a product which product is comprised of real portion providing at least one real output to thereby provide a real function and a dynamic tracer portion comprised of tracer means located within said product and interacting with said real portion for providing at least one tracer output, said piece of software interacting with said product to detect the presence of said at least one tracer output, and displaying an indication of the presence of said at least one tracer output to thereby detect the presence of said product tracer to provide an indication by its presence in other products that such other products had been copied.

In accordance with yet another aspect of the present invention there is provided a method of tracing the origin of an electronic hardware component comprising the steps of: defining a first portion of said electronic hardware component which performs a specific useful function; obtaining at least one output signal from said first portion; defining a second portion of said electronic hardware component which is functional but which does not contribute to the operation of said first portion; connecting said first portion to said second portion so that said second portion operates on said at least one output signal to produce a tracer output signal; and detecting the existence of said tracer output signal to thereby determine the presence, within the electronic hardware component, of said second portion to thereby determine the origin of said electronic hardware component.

In accordance with still another aspect of the present invention there is provided a method of tracing the origin of a piece of software comprising the steps of: defining a first portion of said piece of software which performs a specific useful function; obtaining at least one output from said first portion; defining a second portion of said piece of software which is functional but which does not interact to modify the operation of said first portion; using said at least one output from said first portion to control said second portion to produce from said second portion a tracer output; and detecting said tracer output to thereby detect the presence, within said piece of software, of said second portion to thereby determine the origin of said piece of software.

BRIEF DESCRIPTION OF THE DRAWINGS

The present invention will be described in detail hereinbelow with the aid of the accompanying drawings, in which:

FIG. 5 is a diagram of a portion of a software listing showing one embodiment of the present invention;

FIG. 7 is an example of a software listing which will detect the presence of a dynamic hardware tracer of the present invention.

BEST MODE OF CARRYING OUT OF THE INVENTION

Figure 1:
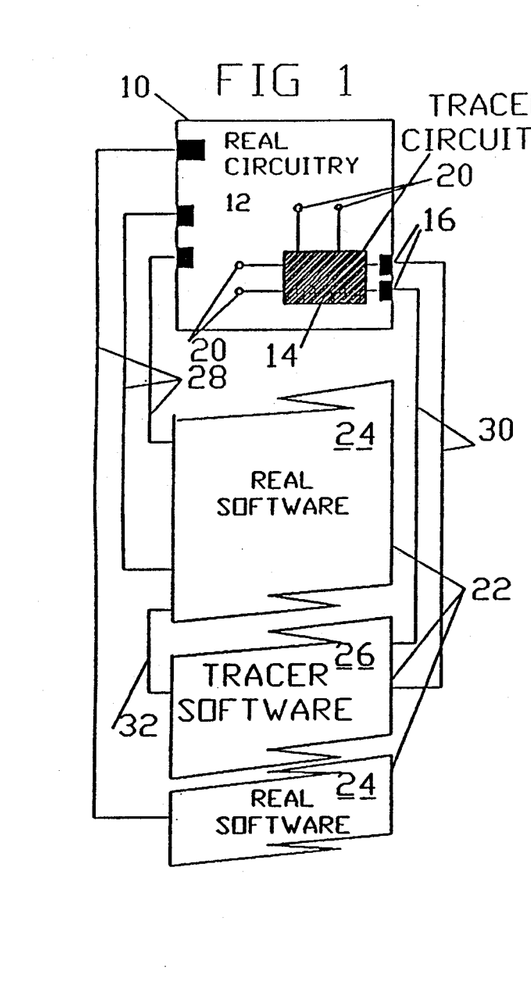
FIG. 1 is a block diagram of one aspect of the present invention.

FIG. 1 shows a first embodiment of the present invention. An integrated circuit 10 includes a portion of real circuitry 12 and a portion of tracer circuitry 14. The real circuitry can be of any type and perform any function. The tracer circuitry is operational circuitry that functions to provide output signals at terminals 16 and receives signals from the real circuitry via input terminals 20. However, the tracer circuitry does not have anything to do with the actual functioning of the integrated circuit. For example if the integrated circuit performs the function of driving a video monitor, the real circuitry 12 performs all of the necessary functions to drive the video monitor. The tracer circuitry acts as a tracer so that if the integrated circuit 10 is reverse engineered with the intent in mind to slightly modify it and copy it, a dynamic tracer will remain in the copied integrated circuit which will be evidence of the fact that the integrated circuit was copied. When the copier reverse engineers the integrated circuit, the result will be scrutinized with the intent of modifying or removing some trivial portion in order to mask the fact that the integrated circuit has been copied. If the tracer circuitry was merely static, in that it did not interact with the real circuitry, or did not produce an output of some kind, it would be much easier to detect and remove. It is extremely difficult to distinguish the dynamic tracer circuitry of the present invention from the real circuitry and so it is not likely that a copier would be able to remove it and have confidence that the modified copied integrated circuit would function properly.

The arrangement shown in FIG. 1 can optionally interact with software which also contains a dynamic tracer. A series of software coding 22 contains portions of real software coding 24 and tracer software coding 26. The real software coding 24 interacts in a normal fashion with the real circuitry 12. Such interactions are shown schematically in FIG. 1 by links 28. The tracer software can interact via link 30 to the tracer circuitry 14. The real software can also send instructions to the tracer software by a link 32. It should be noted that the tracer software does not produce a result or interact with the real software in such a way as to produce a result that is used either by the real software or the real circuitry. As a result, a dynamic tracer is present in the software. A copier when studying the dis-assembled software in an attempt to slightly change the software for the purposes of copying, would not remove the dynamic software tracer because the tracer software appears to legitimately interact with the integrated circuit and/or the real software. The copier could not remove the tracer software for fear of making the resulting copy inoperative. The software tracer therefore becomes a tracer and provides evidence that the software has been copied.

Figure 2:
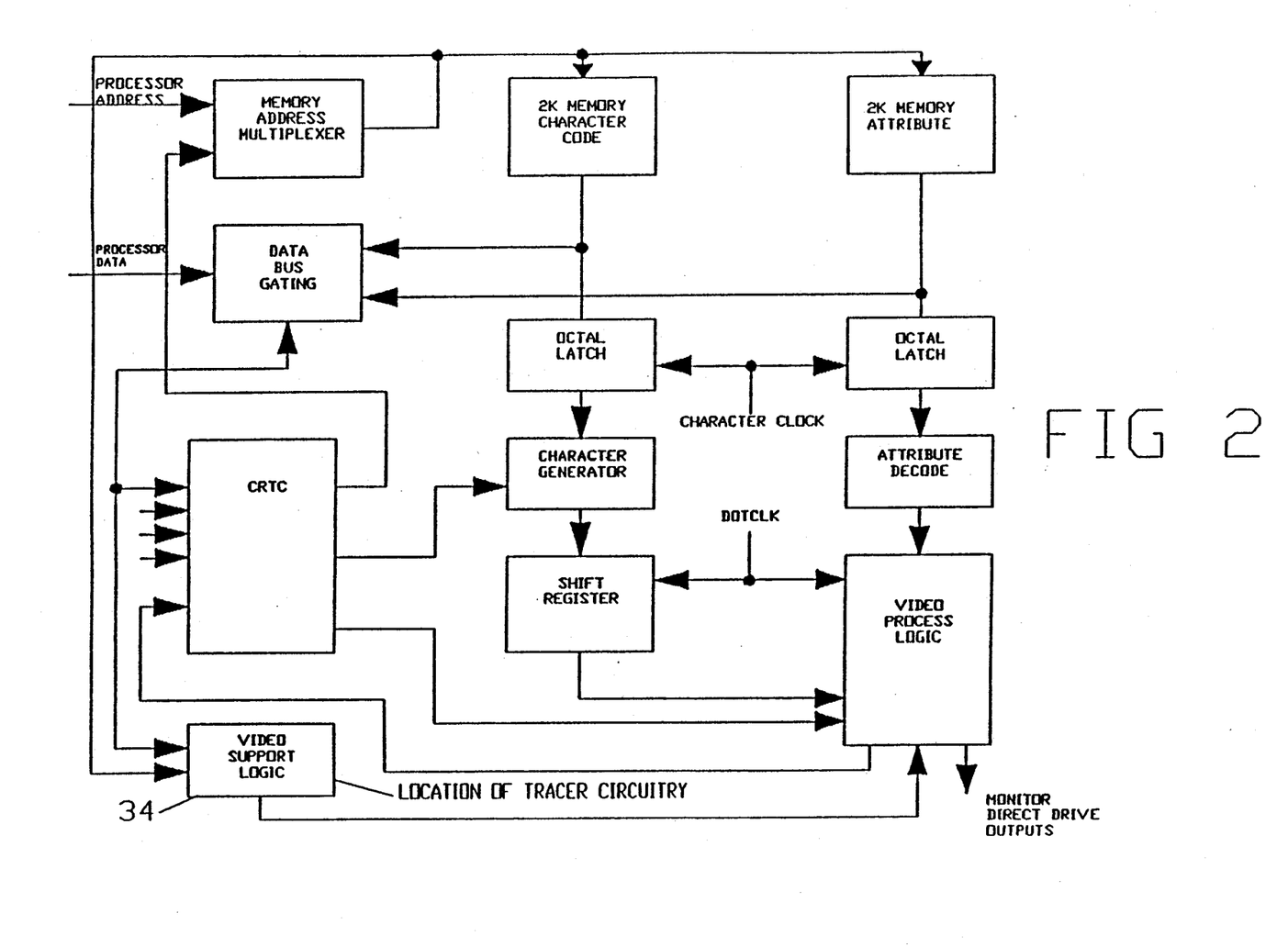
FIG. 2 is a block diagram of one particular embodiment of the present invention.

FIG. 2 is a block diagram of a video monitor and printer driver circuit which has been modified to include tracer circuitry according to the present invention.

The circuit shown in FIG. 2 can be considered to be a bread-board mock-up of an integrated circuit.

It is not necessary for an understanding of the invention to go into a great deal of detail concerning the circuit shown in FIG. 2.

This circuit can be connected to the main bus of a mother-board in a computer. Table 1 shows the relationship between various addresses on that bus and the functions which they represent.

TABLE 1

| I/O Address on Bus | Function |
| --- | --- |
| 3B0 | Not Used |
| 3B1 | Not Used |
| 3B2 | Not Used |
| 3B3 | Not Used |
| 3B4 | 6845 Index Register |
| 3B5 | 6845 Data Register |
| 3B6 | Not Used |
| 3B7 | Not Used |
| 3B8 | CRT Control Port 1 |
| 3B9 | Reserved |
| 3BA | CRT Status Port |
| 3BB | Reserved |
| 3BC | Parallel Data Port |
| 3BD | Printer Status Port |
| 3BE | Printer Control Port |
| 3BF | Not Used |

It can be seen from table 1 that there are several address locations on the bus that are not used. These unused locations can be used for tracer signals and represent the terminals 16 shown in FIG. 1. As a result, it can be seen that the architecture of the bread-board and its interaction with its outside world does not have to be changed to any great degree to implement this invention. This is true in most cases because it seldom occurs that a device will use up all the available ports and their associated addresses for the actual operation of the device.

In this example, addresses 3B0, 3B1 and 3BF, which are not used in the real circuitry are utilized in the tracer circuitry to produce a Screen Column Port, a Screen Row Port, and a Screen Active Port, respectively. In other words, tracer circuitry will be developed which will take signals from the real circuitry and produce tracer signals representing the cursor position on the video monitor with respect to column and row, and a signal representative of the Screen being active or inactive.

The tracer circuitry will be located in video support logic block 34 of FIG. 2.

Figure 3:
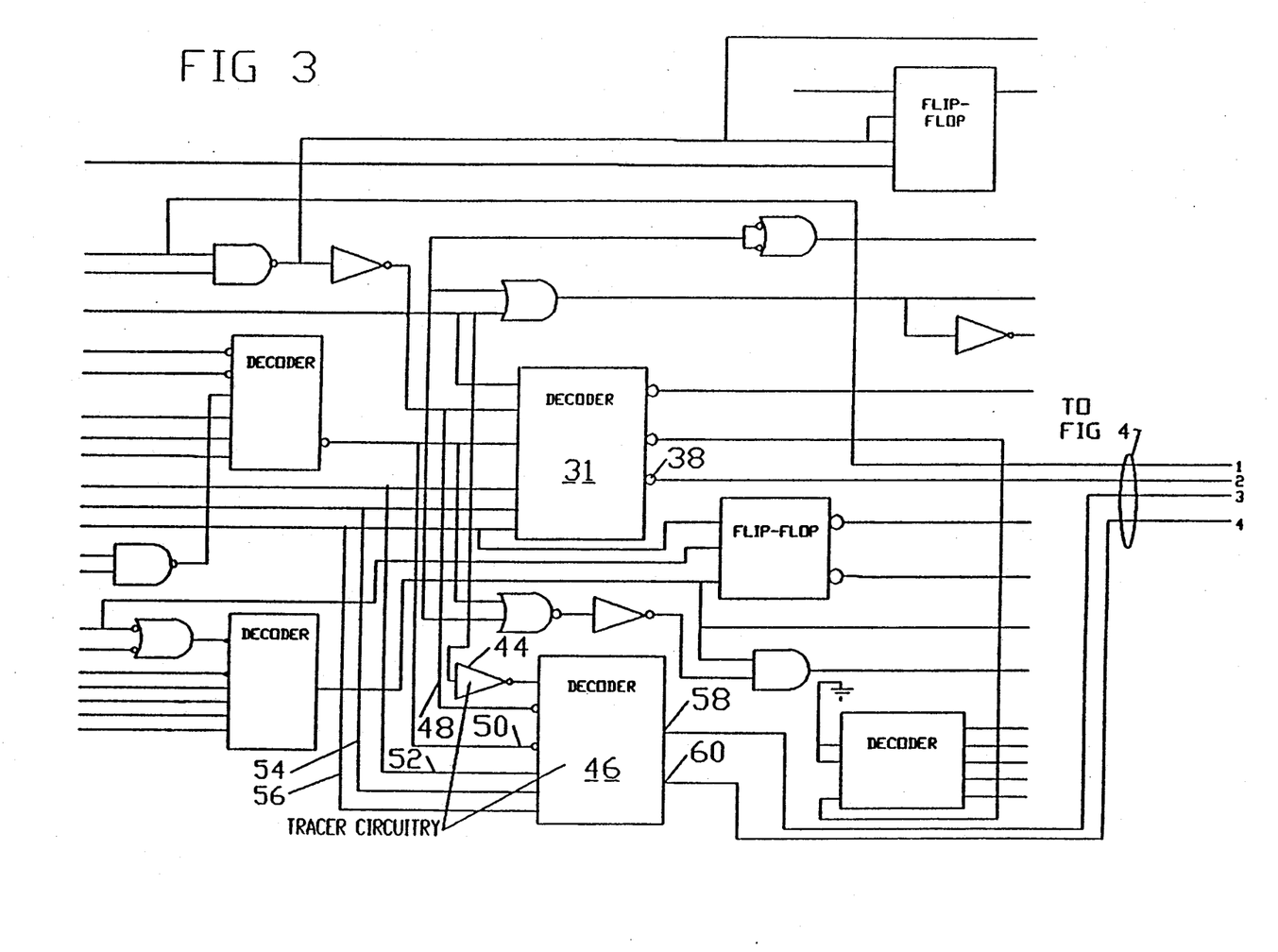
FIG. 3 is a schematic diagram of relevant parts of the embodiment shown in FIG. 2.
Figure 4:
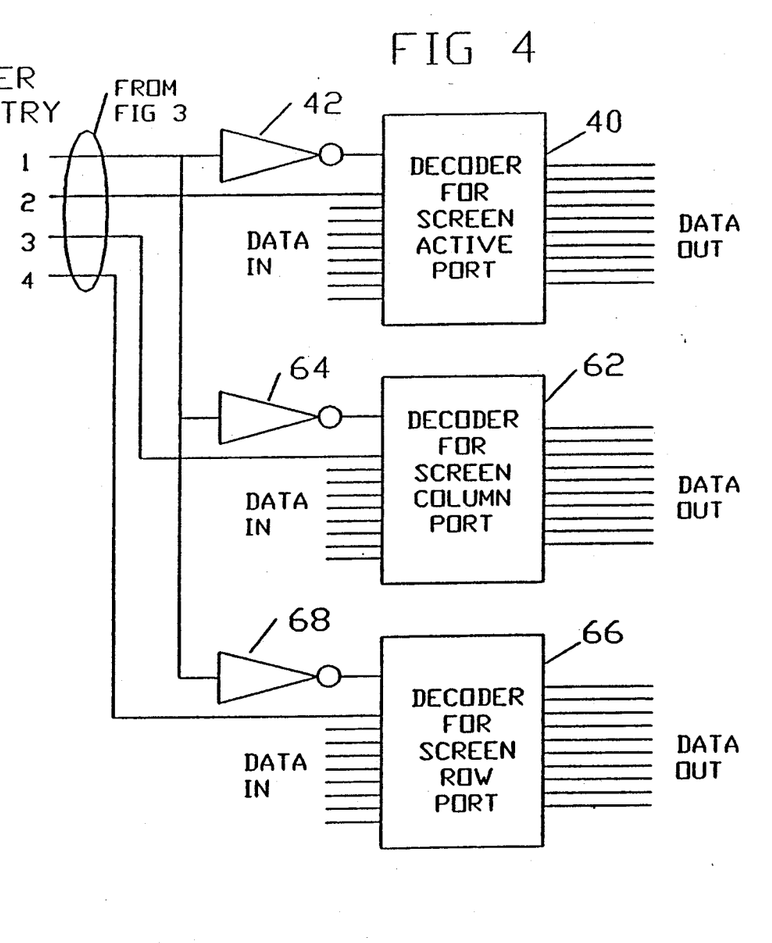
FIG. 4 (appearing on the same sheet of drawings as FIG. 1) is a continuation of the schematic diagram of FIG. 3.

FIGS. 3 and 4 are a more detailed schematic drawing of the video support logic shown in block 34.

The tracer circuitry added to block 34 produces the Bit Number/Function charts shown in tables 2, 3 and 4.

TABLE 2

| Screen Column Port | |
| --- | --- |
| Bit # | Function |
| 0 | — |
| 1 | — |
| 2 | — |
| 3 | —Col Pos |
| 4 | — |
| 5 | — |

TABLE 2-continued

| Bit # | Screen Column Port Function |
|---|---|
| 6 | — |
| 7 | 1 Enable<br>0 Disable |

TABLE 3

| Bit # | Screen Row Port Function |
|---|---|
| 0 | — |
| 1 | — |
| 2 | —Row Pos |
| 3 | — |
| 4 | — |
| 5 | 1 _<br>0 _ Active Pg |
| 6 | 1 _ (1 of 4)<br>0 _ |
| 7 | 1 Enable<br>0 Disable |

TABLE 4

| Bit # | Screen Active Port Function |
|---|---|
| 0 | _ Resolution |
| 1 | _ (1 of 4) |
| 2 | 1 Enable Blink<br>0 Disable Blink |
| 3 | 1 Enable Video<br>0 Disable Video |
| 4 | 1 Update Active<br>0 Update Complete |
| 5 | |
| 6 | Reserved |
| 7 | |

Existing decoder 31 produced a signal at output terminal 38 which is normally not used. This signal is the Screen Active Port Select signal or SAP SEL signal and is fed to decoder 40 shown in FIG. 4. This signal, in conjunction with a timing signal which is inverted by inverter 42 controls the decoder 40 to decode the data appearing on the data in lines to produce the various bit-functions on the data out lines. The decoded signals appearing on the data out lines follow the bit pattern shown in table 4.

Referring again to FIG. 3, an inverter 44 feeds an existing signal from the real circuitry to decoder 46. This signal, in conjunction with the existing signals appearing on lines 48 and 50 controls the decoder 46 so that existing signals appearing on lines 52, 54 and 56 are decoded to produce a Screen Column Port Select signal SCP SEL and a Screen Row Port Select signal SRP SEL on output terminals 58 and 60, respectively.

The SCP SEL signal is fed to decoder 62 shown in FIG. 4 and, taken in conjunction with the timing signal inverted by inverter 64, produces the bit pattern shown in table 2 on data out lines from signals appearing on data in lines for that decoder.

The SRP SEL signal is fed to decoder 66 shown in FIG. 4 and, taken in conjunction with the timing signal inverted by inverter 68, produces the bit pattern shown in table 3 on data out lines from signals appearing on data in lines for that decoder.

The tracer circuitry added to the real circuitry of the integrated circuit consists of inverters 42, 44, 64, and 68 and decoders 40, 46, 62 and 66. It must be understood that this tracer circuitry forms only a very small part of the total real circuitry of the integrated circuit. Furthermore, it should be understood that the circuitry shown is merely an example of the invention and the invention is in no way limited to the circuitry shown.

FIG. 5 is a portion of a software code listing which checks the circuitry of the video monitor and printer driver shown in FIG. 2 and the circuitry of the tracer circuitry added and shown in FIGS. 3 and 4. Prior to operation, at each start-up or boot of a computer having such a video monitor and printer driver, a program stored in a ROM located on the mother-board is run which is known as a diagnostic program. It is the function of this program to check the various functions of the video monitor and printer driver integrated circuit to insure proper operation of that circuit.

FIG. 5 includes blocks of real software 70 and a block of software tracer 72 imbedded in the real software. The real software checks the real circuitry of the integrated circuit. It is critical to the operation of the computer that the diagnostic checks be correct on this portion of the circuitry. The tracer software interacts with the tracer circuitry to check that circuitry. Since the operation of the tracer circuitry has nothing whatever to do with the operation of the actual integrated circuit, the fact that there are diagnostic results of the tracer circuitry derived from the operation of the tracer software is irrelevant.

What is not irrelevant is the existence of the tracer circuitry and software in both the integrated circuit and the software program. Their existence provides the dynamic hardware tracer and dynamic software tracer of the present invention.

Figure 6:
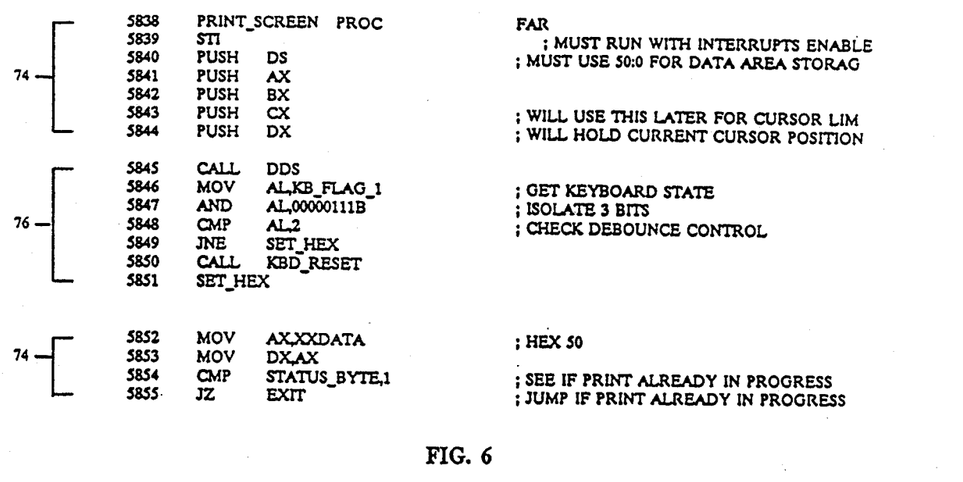
FIG. 6 is a diagram of a portion of a software listing showing another embodiment of the present invention.

It is not necessary, according to the present invention that the software tracer have actual hardware with which to interact. A dynamic software tracer can exist without interaction with hardware as long as the software tracer has real software with which to interact. FIG. 6, is an example of such software. In this example, blocks of real software coding 74 interact with blocks of software tracer coding 76 to provide the dynamic tracer. It should be noted that the tracer software 76 receives and processes data from the real software 74. However, the results of the processing of this tracer data is not used in the operation of the real software. If the software tracer was used, it would not fulfil its function as a tracer because it would no longer be tracer software.

In the past, if one suspected that an integrated circuit was copied, it was necessary, from the outset, to reverse engineer the suspected circuit in order to try to find similarities with the original circuit in order to provide evidence of copying. This operation is costly.

Since, as is shown in FIG. 1, the tracer circuitry 14 produces signal outputs on output terminals 16, these signals can be detected. Software, i.e. software similar to the software tracer 26 shown in FIG. 1 can be provided for detecting and displaying an indication of the presence of the tracer signals generated by the tracer circuitry. That software can therefore detect the presence of the tracer circuitry, because if the signals exist, so must the circuitry.

Running this tracer circuitry detection software on an integrated circuit suspected of being copied is much less expensive than reverse engineering the suspected integrated circuit at the outset.

An example of this software is shown in FIG. 7 and is a piece of software which tests the diagnostics of only the tracer circuitry shown in FIG. 2. This software provides an indication of the presence of tracer signals generated by tracer circuitry and is therefore an indicator of the existence of tracer circuitry in an integrated circuit under test. This software is an example of tracer circuitry detection software. It is very similar to the block of software tracer shown in FIG. 5, but it does produce a useful output, namely an indication of the existence of the tracer signals discussed above.

We claim:

1. A dynamic hardware tracer for use in first integrated circuit which is comprised of a first circuit for generating at least one signal which is indicative of performing a predetermined function, the hardware tracer comprising:
   a second circuit which performs a function independent of said first circuit and does not interact with said first circuit to modify said predetermined function of said first integrated circuit;
   means for receiving and processing at least one input signal from said first circuit; and
   means for producing at least one detectable output signal from the processed signal on at least one one detectable output terminal wherein said output signal does not interact with the first circuit to modify the predetermined function of the first integrated circuit, whereby said dynamic hardware tracer, by its presence in at least one other integrated circuit, provides an indication that said other integrated circuit has been copied from said first integrated circuit.

2. The dynamic hardware tracer of claim 1 wherein said tracer circuitry is formed as an integral part of the first circuit.

3. A first integrated circuit comprising:
   first circuit which performs a predetermined function;
   tracer circuitry means, connected to said first circuit, for electrically processing at least one signal generated by said first circuit, said tracer circuitry performing a function independent of said predetermined function; and
   means for producing at least one detectable output signal from said tracer circuitry, wherein said at least one detectable output signal does not modify said predetermined function of said first integrated circuit, whereby said tracer circuitry means, by its presence in at least one other integrated circuit, provides an indication that said other integrated circuit has been copied from said first integrated circuit.

4. A dynamic tracer means including a computer, an integrated circuit, and a dynamic software tracer located within a first software product running on said computer wherein said first software product interacts with at least one predetermined output signal produced by first circuit which performs a predetermined function within said integrated circuit, the dynamic software tracer comprising:
   software tracer code means inbedded in said first software product, for performing a dynamic tracer function independent of said first software product and not affecting the operation of said first software product; and
   means, in said software tracer code means for interacting with at least one tracer output signal from tracer circuitry in said integrated circuit wherein said software tracer code means does not affect the operation of said first software product or said function of said first circuit, whereby said software tracer code means, by its presence in at least one other software product, provides an indication that said other software product has been copied from said first software product.

5. The dynamic tracer of claim 4, wherein said software tracer code means interacts with said first software product to receive instructions from said first software product, said software tracer code means performing processing based on said instructions.

6. A dynamic tracer means including a computer, and a first software product running on said computer comprising:
   software code means for providing a predetermined function;
   software tracer code means, imbedded in said software code means, for performing a function independent of said software code means and not affecting the operation of said first software product;
   means, in said software tracer code means, for receiving and processing at least one instruction from said software code means; and
   means for producing from the processed instruction at least one traceable output signal, which does not affect the operation of said software code means, whereby said software tracer code means, by its presence in at least one other software product provides an indication that said other software product has been copied from said first software product.

7. A computing system comprising:
   a computer means for running software means for detecting the presence of a dynamic product tracer located within a product which is comprised of a first portion which provides at least one predetermined output to perform a predetermined function, and said dynamic product tracer comprised of tracer means located within said product and interacting with said first portion for providing at least one tracer output;
   means for detecting the presence of said at least one tracer output in said product; and
   means for providing an indication of the presence of said at least one tracer output to thereby detect the presence of said dynamic product tracer, whereby said dynamic product tracer, by its presence in at least one other product provides an indication that said at least one other product has been copied from said software product.

8. The computing system claim 7, wherein said product is at least one selected from the group of products comprising an integrated circuit, a computer program, firmware and microcode.

9. A method of dynamically tracing the origin of an electronic hardware component comprising the steps of:
   (a) defining a first portion of said electronic hardware component which performs a predetermined function;
   (b) obtaining at least one output signal from said first portion;
   (c) defining a second portion of said electronic hardware component which is functional but which does not modify the operation of said first portion;
   (d) connecting said first portion to said second portion so that said second portion operates on said at least one output signal to produce a dynamic output signal; and (e) detecting the existence of said dynamic tracer output signal to thereby determine the presence, within the electronic hardware component, of said second portion to thereby determine the origin of said electronic hardware component.

10. A method of dynamically tracing the origin of a software product comprising the steps of:

(a) running said software product on a computer, (b) defining a first portion of said software product which performs a predetermined function;

(c) obtaining at least one output from said first portion;

(d) defining a second portion of said software product which is functional but which does not interact to modify the operation of said first portion;

(e) using said at least one output from said first portion to control said second portion to produce from said second portion a dynamic tracer output; and (f) detecting said dynamic tracer output by means of said computer to thereby detect the presence, within said software product, of said second portion to thereby determine the origin of said software product.

* * * * *